2,750,419
Patented June 12, 1956

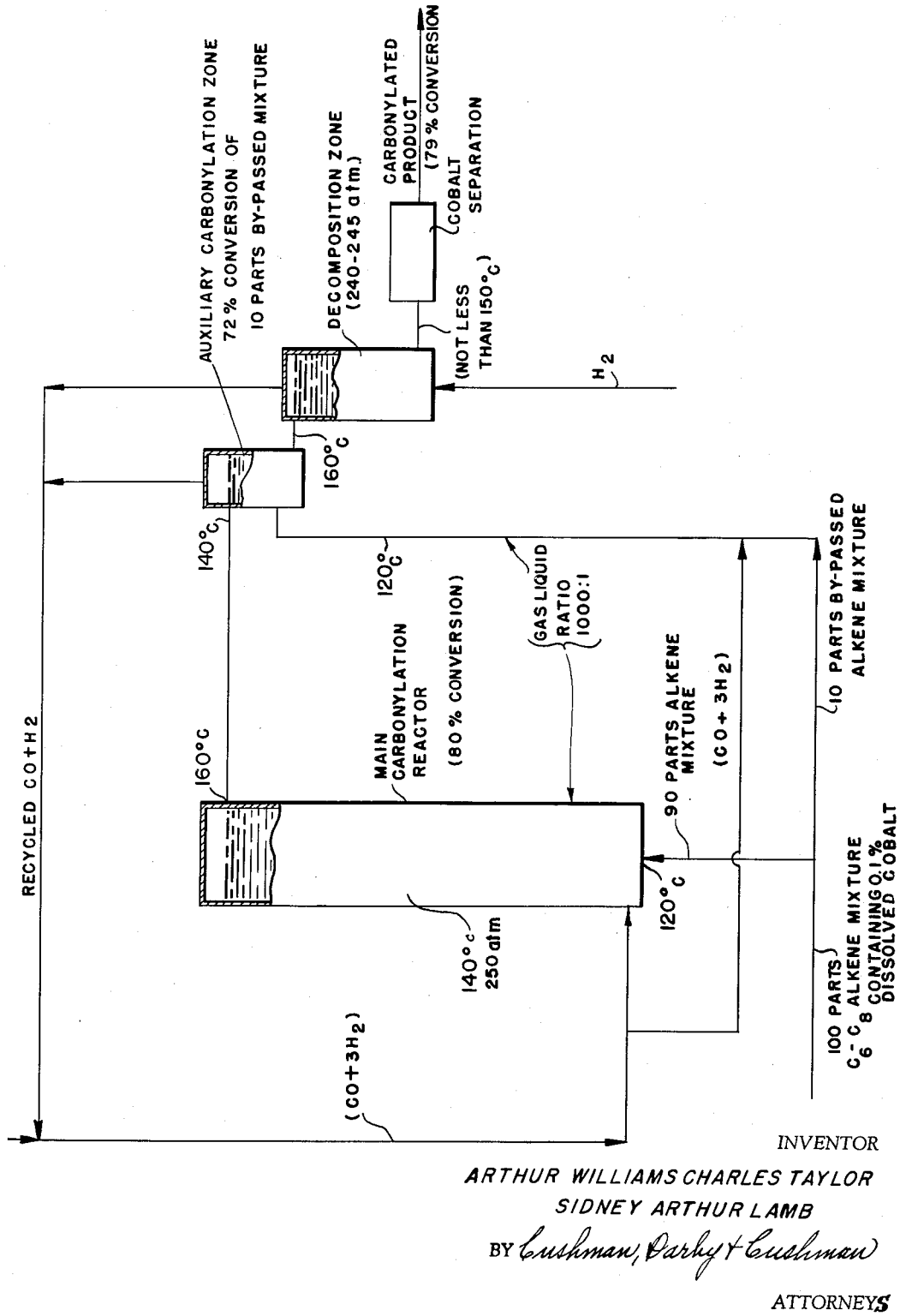

2,750,419
PRODUCTION OF OXYGEN-CONTAINING ORGANIC COMPOUNDS

Arthur William Charles Taylor and Sidney Arthur Lamb, Norton-on-Tees, England, assignors to Imperial Chemical Industries Limited, a corporation of Great Britain Application March 23, 1953, Serial No. 344,249

Claims priority, application Great Britain April 2, 1952

14 Claims. (Cl. 260—604)

This invention relates to the production of oxygen-containing organic compounds.

We have found in the production of oxygen-containing compounds by reacting olefinic compounds, especially alkenes containing up to 18 carbon atoms and alicyclic mono-olefines, with carbon monoxide and hydrogen under elevated temperature and pressure in the liquid phase in the presence of a catalyst such as cobalt or a cobalt compound that the optimum operating temperature for the subsequent stage in which the reaction product is treated with hydrogen, or an inert gas under pressure, to decompose metal carbonyl or hydrocarbonyl contained therein is close to the optimum operating temperature for the main reaction, sometimes being a little less than, and sometimes exceeding, the latter. The temperature in the main reaction should not be allowed to rise above the optimum required there, since the conversion tends to fall: nor should the temperature in the decomposition stage be allowed to fall below the optimum temperature required there, since decomposition of the catalyst complex would then be incomplete and catalyst would be retained in the product, resulting in loss of costly metal and causing lower efficiency in the process of hydrogenation to alcohol, which generally follows the main process. We have further found that owing to unavoidable thermal losses, it is difficult to maintain both of these temperatures simultaneously at their optimum levels, and therefore that the process as previously operated tends to be inefficient.

There is therefore provided according to the present invention a continuous process for the carbonylation of olefinic compounds by means of a gas comprising carbon monoxide and hydrogen at elevated temperature and superatmospheric pressure in the presence of a dissolved cobalt catalyst and including as an essential feature the subsequent step of simultaneously decomposing cobalt compounds dissolved in the carbonylation product and precipitating the cobalt as metal by treatment of the carbonylation product in a decomposition zone with hydrogen at elevated temperature and pressure, characterized by the feature that the temperature range in the decomposition zone is maintained within the optimum range desired there by providing between the outlet from the carbonylation main reaction zone and the inlet to the decomposition zone an auxiliary zone through which the carbonylation product is passed and arranging that further carbonylation to the extent of from 2 to 15% of the total carbonylation which occurs in the system occurs between the outlet from the carbonylation zone and the inlet to the decomposition zone whereby heat is evolved and the amount of this carbonylation is controlled so that the liquid at its entry to the decomposition zone is maintained at the desired temperature. When this figure falls below 2% control of the temperature at the desired level becomes difficult owing to the small amount of surplus heat developed, and even with 2% the surplus tends to be on the low side. It is therefore preferred that at least 3% of further carbonylation takes place. The upper limit should not exceed 15% since then the over-all efficiency of carbonylation tends to decrease. Degree of carbonylation is expressed as per cent by weight of olefinic compound converted per pass.

In this process the carbonylation process is preferably operated with a reactant inlet temperature of 110°–150° C. depending on the olefinic compound and a product outlet temperature of 110°–180° C., more preferably 150°–170° C.: and the decomposition zone with a product outlet temperature of 150°–170° C., and a product inlet temperature not exceeding 170° C. With $C_8$ and higher olefines it is preferred to employ a carbonylation inlet temperature of at least 140° C. The pressures commonly used in the Oxo-reaction may be used, but it is preferred to operate both zones within the range 200–300 atmospheres gauge, the decomposition zone being run at a slightly lower pressure, e. g. 5–10 atmospheres less than the carbonylation zone. As catalyst there may be employed, for example, soluble cobalt compounds such as the acetate, nonanoate, or oleate, the butoxy-butyrate, the hexahydrobenzoate, or the naphthenate. With alkenes and alicyclic mono-olefines only a low concentration of cobalt is necessary and it is found that this facilitates efficient reaction, decomposition, separation of the precipitated cobalt metal, e. g. by magnetic means, and ready regeneration of the separated metal to active catalyst, besides being economic in expensive cobalt metal.

Preferably the amount of carbonylation occurring between the main carbonylation zone and the decomposition zone is 5–10% of the over-all carbonylation occurring in the process. Operating in this manner, it is possible to obtain an over-all conversion not appreciably less than that which would be obtained in the main carbonylation zone were the latter running under its own optimum as hereinafter defined. The preferred method of operating according to the invention is to run the carbonylation zone within a suitable temperature range for the olefine being treated and to control the amount of further carbonylation taking place outside the carbonylation zone so that the temperature of the liquid entering the decomposition zone is maintained accurately at the desired level.

The present invention is limited to a process of carbonylation in which the catalyst is present as a dissolved cobalt compound and does not include within its scope processes in which massive or supported cobalt metal or cobalt slurry are employed as catalyst, either alone or along with dissolved cobalt compounds.

Care must be taken to ensure that the temperature of the product leaving the carbonylation zone does not fall so far below that required at the inlet to the decomposition zone that it is impossible to raise it by further carbonylation, bearing in mind that the heat evolution in the carbonylation process per gram mole of hydrocarbon is about 35 kilo cals. Moreover, the temperature in the auxiliary zone must not be allowed to fall below the temperature of initiation of the carbonylation reaction.

Previously the attempt has been made in the art to solve the present problem by supplying heat to the liquid by means of an indirect heat exchanger, the surface of which is maintained at an appreciably higher temperature than the liquid, but this procedure suffers from the disadvantage that metallic cobalt is deposited on the heat exchange surface or surfaces, so causing choking and reducing the heat transfer efficiency. Alternatively, according to the prior art hot cobalt-free fluids have been added to the carbonylation product prior to its entry to the decomposition zone, but the process of the present invention is superior to that procedure in that no additional heat transfer equipment is needed and the subsequent steps in the treatment of the product are not complicated by the need for handling or treating extra diluent material.

The process of the present invention has its most important application to alkenes-1 or mixtures containing them, especially those having up to 12 carbon atoms in the molecule, with which the temperature of carbonylation tends to be lower than that required in the decomposition zone, e. g. a temperature at the outlet from the carbonylation zone of 140°–170° C.

The auxiliary zone in which the additional carbonylation takes place preferably comprises a gas/liquid separation vessel known as a catch-pot, which is situated between the main carbonylation zone and the decomposition zone, but it may comprise an additional high pressure vessel prior to the last gas/liquid separation vessel. This last described procedure has the disadvantage, however, that heat losses are increased. Most preferably it comprises a catch-pot situated in close juxtaposition to the decomposition zone, since then the product stream entering the decomposition zone can easily be kept hot enough to give in the latter the optimum temperature required there. A suitable form of catch-pot is a cylindrical high pressure forging provided at the top with an outlet pipe for the separated gas and at the bottom with an outlet pipe for the liquid product, and having an inlet pipe for the mixture of gas and liquid to be treated which may be situated above, but is preferably situated below, the liquid level in the catch-pot.

The time of residence of the liquid in the auxiliary vessel, and therefore the size of the latter need to be carefully selected, and it is most frequently desirable that the residence time in the auxiliary vessel be sufficiently long to enable the further carbonylation to proceed substantially to completion. As already mentioned it is desirable that the amount of additional carbonylation do not exceed 15%, and preferable that it do not exceed 10%, of the whole. Taking this factor into account and allowing for any carbonylation that takes place in the pipe line, it is desirable that the capacity of the auxiliary zone be such that the time of residence in it does not exceed 15%, and preferably does not exceed 10% of the time of residence of the liquid in the main carbonylation reactor. Catch-pots having a capacity of about 5% of the main carbonylation zone have been found suitable. Preferably, the dimensions of the auxiliary vessel are selected, compatibly with their other functions, so that the ratio, area of external surface: volume, is a minimum and heat loss is thereby kept as low as possible.

The process of the invention may be operated in various ways, e. g. all of the olefinic material may be introduced to the main carbonylation zone, the major part of carbonylation effected there, and the residue effected in the auxiliary vessel; or it may be arranged that a minor portion of the olefinic compound by-passes the main carbonylation zone, that carbonylation of the bulk of the olefinic compound is substantially completed in the main zone and that the additional heat required is obtained by the carbonylation in the auxiliary zone of the minor amount of olefinic compound.

Operating according to the first procedure control of the amount of heat release can be readily achieved by variation of the liquid feed rate to, and the take-off from the main reaction zone, e. g. by means of a valve or valves, to ensure that say only 85%, or 90% of the carbonylation which would normally take place there, does in fact take place there, and that further carbonylation takes place in the auxiliary zone through which the product passes on its way to the decomposition zone. When the process is operated in this way, a small amount of carbonylation may also occur in the lines connecting the vessels.

According to the second procedure a proportion of the olefinic feed mixture, say 15%, preferably not more than 10% is diverted and passed via a by-pass line to the auxiliary zone and is directly carbonylated there, thus affording the additional heat required. The by-passed material may be olefine alone, but preferably and conveniently contains dissolved cobalt catalyst. In this variant of the process preferably, also, additional carbonylating gas is introduced to the said vessel in which the further carbonylation takes place.

The second method is preferred since it gives improved control of the further carbonylation and facilitates better regulation of the temperature of the liquid entering the decomposition zone, which is the important temperature. Operating in this manner, for example, the carbonylation zone may be run at a high conversion, e. g. 80% of the olefinic compound, 10% of the latter may be by-passed and introduced into the auxiliary zone, and its time of residence arranged so that the degree of conversion of the by-passed olefine taking place therein corresponds to at least 90% of that occurring in the main carbonylation zone. In these circumstances the degree of conversion of the product entering the decomposition zone is about 79%.

By "conversion" in this specification is meant the proportion of olefinic compound which is destroyed in the carbonylation reaction.

The process of the invention is also applicable where there is no separate catch-pot between the carbonylation and decomposition zones, and the gas/liquid separation takes place at the top of the decomposition zone. An auxiliary vessel is then provided between the main carbonylation zone and the decomposition zone and the further carbonylation is effected in the auxiliary vessel.

The two procedures can be operated in combination, but it is preferred not to do this since control of the process and of the total degree of carbonylation is then difficult.

Advantages of the invention are that both the main reaction and the decomposition stage can be conducted within their optimum ranges of temperature, even if that for the latter is higher than that for the former (as it frequently is with alkenes-1) without the necessity of employing thermal insulation with its attendant disadvantage of increased cost. The invention is beneficial even if the optimum temperature for decomposition is equal to or somewhat lower than that for carbonylation, since loss of heat between the zones is inevitable. This loss can be compensated to the desired degree by the method of the invention. Moreover the system as a whole is sufficiently flexible to ensure that variations in temperature due to extraneous causes e. g. variation in atmospheric temperature and variation in the feed rate to the carbonylation zone, are taken care of. By optimum conditions and optimum temperature respectively are meant those conditions or that temperature which, taking into account factors such as conversion, reaction rate, throughput, facility and efficiency of operation, and cost, give a broad compromise reconciling these factors in a way most appropriate to the commercial manufacture or operation proposed. This is well understood by persons skilled in the art.

The simple procedure of the invention does not suffer from the disadvantages attending the alternative procedure of reheating the carbonylation product, viz. that dissolved cobalt is deposited on the heating surfaces and is thus lost to the system, or else is deposited in pipes or valves and causes choking.

As already indicated the decomposition stage is preferably conducted at a pressure somewhat less than that at which the main reaction is conducted and preferably decomposition and stripping are effected by means of as small a stream of hydrogen as possible, in order to facilitate maintenance of the correct $CO:H_2$ ratio in the gas recycled to the carbonylation stage. This drop in pressure furthers smooth flow between the two zones without the need for additional pumps.

When the additional carbonylation is effected by by-passing a proportion of the olefinic feed the process of the invention may be operated in several ways.

Thus the vessel in which the additional carbonylation takes place may comprise, for example, a cylindrical high pressure catch-pot provided in the liquid space with a vertical arcuate septum extending above the liquid level and dividing the liquid into two zones. One of these zones, preferably that of larger cross section, is provided with a series of horizontal baffles or sieve plates for effecting intimate mixture of the gas and liquid. The main stream of carbonylation product and the minor amount of olefinic compound, preferably containing dissolved cobalt catalyst, which is by-passed, are both introduced above or preferably just below the liquid level in the larger zone, and desirably carbonylating gas is introduced at or near the bottom, thereof. Gas separated from the liquid in both zones of the catch-pot is taken off overhead, the liquid in which the further carbonylation has taken place flows through at the bottom into the smaller zone and is led thence through a suitably disposed off-take pipe into the decomposition zone.

Alternatively, the vessel in which additional carbonylation takes place may comprise a cylindrical high pressure catch-pot provided at the top with a gas outlet pipe and at the bottom with an inlet pipe for the minor amount of the by-passed olefinic compound (preferably containing dissolved cobalt catalyst), and with inlet pipes for carbonylating gas. The take-off pipe for the liquid product comprises a vertical stand pipe.

Flexibility of operation can be achieved in both procedures by providing the auxiliary vessel with a number of take-off pipes at different levels, each provided with a valve. In this way, the liquid capacity of the vessel can be varied and consequently the residence time adjusted to suit the additional amount of carbonylation needed to give the desired temperature of the liquid entering the decomposition zone.

The invention is illustrated by the following examples.

Example 1

In a reactor operating at 250 atmospheres to which diisobutene containing 0.1% cobalt in solution as the naphthenate was introduced at a liquid space velocity of 0.2 litre per litre of reaction space per hour together with 1:3 $CO:H_2$ mixture at a volume rate of gas to liquid (measured at 20° C. and 1 atmosphere) of 1200:1 the degree of conversion at the exit was 80% by weight when the temperature at the same point was 155° C. This issuing product was fed, via a catchpot having a liquid capacity of about 5% of that of the main carbonylation reactor, to a catalyst decomposition zone in which it was treated without external heating with hydrogen to expel carbon monoxide and decompose metal carbonyl. However, it was found that the temperature of the liquid issuing from the decomposition zone was only 130°, which is lower than the optimum temperature of 150° C. required there.

By increasing the feed rate to, and the removal rate from the main reactor to 1.5 times what they were (and thus decreasing the conversion there to 76%) it was found possible to maintain the temperature at the exit of the decomposition zone at 150° C., which is the optimum, and this was achieved without lowering the overall conversion in the system which remained at 80% by weight.

Example 2

A mixture of $C_6-C_8$ alkenes containing 0.1% of cobalt as a soluble salt and preheated to 120° C. was treated with a mixture of carbon monoxide and hydrogen in which the molar ratio $CO:H_2$ was 1:3 at an average temperature in the reaction zone of 140° C. and a pressure of 250 atmospheres gauge, the outlet temperature being 160° C. A minor portion of the alkene feed mixture containing catalyst was not fed to the main reaction but was by-passed to a catchpot on the exit side of the reactor and to this vessel a mixture of carbonylating gas with a molar ratio, $CO:H_2$, of 1:3 was also fed in the volumetric ratio (measured at 20° C. and 1 atmosphere) gas:liquid of 1000:1.

The aforesaid minor proportion of alkene mixture was selected so that the amount of alkene reacted in the catch-pot was approximately 10% of that reacted in the main carbonylation reactor, the capacity of the catch-pot being such as to give a residence time therein of 10% of that in the main carbonylation reactor. The heat developed in the catch-pot in this way was sufficient to raise the temperature of the liquid entering the catalyst decomposition zone to 160° C., which is a very suitable temperature for cobalt carbonyl decomposition. The pressure in the decomposition zone was a few atmospheres less than that in the carbonylation reactor.

Example 3

Propylene was carbonylated with a gas mixture having a molar ratio, $CO:H_2$, of 1:3 in the liquid phase under a total pressure of 250 atmospheres gauge using as reaction medium a mixture of oxygenated compounds boiling in the range of 180°–200° C., the volumetric ratio of propylene to reaction medium under the reaction conditions being 1:1. The concentration of cobalt in the reaction mixture was about 0.1%, the gas:total liquid volume ratio measured at N. T. P. was 800:1 and the total liquid space velocity about 0.6 litre per litre of reaction space per hour.

High conversion of the propylene (93%) took place and the temperature of the liquid product leaving reaction zone was 170° C. The product was then passed by way of a catch-pot for separating gas and liquid to a catalyst decomposition zone where it was treated with hydrogen. The temperature of the liquid leaving the catch-pot was 150° C. and this led to the temperature in the decomposition zone being too low and consequently to inefficient stripping of carbon monoxide and decomposition of cobalt carbonyl compounds.

This situation was remedied by injecting liquid propylene at a volume rate of 7.5% measured relative to the propylene fed to the main reactor to the catch-pot at a point remote from the liquid product outlet together with carbonylating gas of the same composition in a ratio by volume of gas (measured at N. T. P.) to liquid propylene (measured under reaction conditions of 400:1). The heat evolved by this additional carbonylation was sufficient to raise the temperature of the liquid leaving the catch-pot to 160° C., and the temperature of the liquid leaving the decomposition zone to about 150° C. The decomposition zone could then be operated within the optimum range of temperature and functioned efficiently.

The accompanying flow-sheet illustrates the present invention using the specific conditions disclosed in Example 2.

We claim:

1. In a continuous process for the carbonylation of olefinic compounds with a gas comprising carbon monoxide and hydrogen at elevated temperature and superatmospheric pressure in the presence of a dissolved cobalt catalyst in a carbonylation zone followed by the decomposition of cobalt compounds dissolved in the carbonylation product and precipitation of the cobalt as metal by treatment of the carbonylation product in a decomposition zone with hydrogen at elevated temperature and pressure, the improvement which comprises maintaining the temperature range in the decomposition zone within the optimum range desired there by providing between the outlet from the carbonylation main reaction zone and the inlet to the decomposition zone an auxiliary zone through which the carbonylation product is passed and arranging that further carbonylation to the extent of from 2 to 15% of the total carbonylation which occurs in the system occurs between the outlet from the carbonylation zone and the inlet to the decomposition zone whereby heat is evolved and controlling the amount of this further carbonylation to maintain the liquid at its entry to the decomposition zone at the desired temperature.

2. A process as claimed in claim 1 in which the amount of further carbonylation is at least 3% of the total carbonylation which occurs in the system.

3. A process as claimed in claim 1, wherein the whole of the liquid passes from the carbonylation zone via the auxiliary zone to the decomposition zone, and carbonylation is controlled so that at least 85% of the carbonylation which would normally take place in the main carbonylation zone does in fact take place there and further carbonylation, in excess of 2% of the total carbonylation which occurs in the system occurs between the outlet to the main carbonylation zone and the inlet to the decomposition zone.

4. A process as claimed in claim 1 wherein a minor portion up to 15% of the olefinic starting material by-passes the main carbonylation zone and is introduced into the auxiliary zone together with the already carbonylated material from the main carbonylation zone, and this by-passed material is carbonylated in said auxiliary zone.

5. A process as claimed in claim 4 wherein a minor proportion of carbonylating gas is introduced to said auxiliary zone.

6. A process as claimed in claim 1 in which the auxiliary carbonylation zone is a catch-pot in close juxtaposition to the decomposition zone.

7. A process as claimed in claim 1 wherein minor proportion up to 10% of the olefinic starting material by-passes the main carbonylation zone and is introduced into the auxiliary zone together with the already carbonylated material from the main carbonylation zone and the average time of residence of the mixture so produced in the auxiliary zone is up to 10% of the average residence time of the liquid in the main carbonylation zone.

8. A process as claimed in claim 1 in which the temperature of the liquid leaving the main carbonylation zone is within the range 110°–180° C. and the temperature at the outlet of the decomposition zone is within the range 150°–170° C.

9. A process as claimed in claim 8 in which the olefine contains 8 or more carbon atoms and the temperature of the liquid entering the main carbonylation zone is at least 140° C.

10. A process as claimed in claim 1 in which the decomposition zone is operated at a slightly lower pressure than the carbonylation zone.

11. In a continuous process for the carbonylation of olefinic compounds with a gas comprising carbon monoxide and hydrogen at elevated temperature and superatmospheric pressure in the presence of a dissolved cobalt catalyst in a carbonylation zone followed by the decomposition of cobalt compounds dissolved in the carbonylation product and precipitation of the cobalt as metal by treatment of the carbonylation product in a decomposition zone with hydrogen at elevated temperature and pressure, the improvement which comprises maintaining the operating temperature in the decomposition zone close to the operating temperature in the carbonylation zone by providing an auxiliary zone between the outlet from the carbonylation zone and the inlet to the decomposition zone, passing the product of said carbonylation zone through said auxiliary zone and then to said decomposition zone and conducting further carbonylation to the extent of from 2 to 15% of the total carbonylation which occurs in the system between the outlet from the carbonylation zone and the inlet to the decomposition zone.

12. A process as claimed in claim 11 in which said carbonylation zone and said decomposition zone are operated at a pressure with the range of 200–300 atmospheres gauge, the carbonylation zone is operated to have a product outlet temperature within the range of 110°–180° C. and the decomposition zone is operated to have a product outlet temperature of from 150°–170° C.

13. A process as claimed in claim 12 in which said decomposition zone is operated at a slightly lower pressure than said carbonylation zone.

14. In a continuous process for the carbonylation of alkenes-1 having up to 12 carbon atoms in the molecule and mixtures containing the same with a gas comprising carbon monoxide and hydrogen at elevated temperature and superatmospheric pressure in the presence of a dissolved cobalt catalyst in a carbonylation zone followed by the decomposition of cobalt compounds dissolved in the carbonylation product and precipitation of the cobalt as metal by treatment of the carbonylation product in a decomposition zone with hydrogen at elevated temperature and pressure, the improvement which comprises maintaining the operating temperature in the decomposition zone above the operating temperature in the carbonylation zone by providing an auxiliary zone between the outlet from the carbonylation zone and the inlet to the decomposition zone, passing the product of said carbonylation zone through said auxiliary zone and then to said decomposition zone and conducting further carbonylation to the extent of from 2 to 15% of the total carbonylation which occurs in the system between the outlet from the carbonylation zone and the inlet to the decomposition zone, the temperature at the outlet from the carbonylation zone being from 140°–170° C.

References Cited in the file of this patent

UNITED STATES PATENTS

| 2,530,989 | Parker | Nov. 21, 1950 |
| 2,557,701 | Smith | June 19, 1951 |

FOREIGN PATENTS

| 629,915 | Great Britain | Sept. 30, 1949 |
| 660,737 | Great Britain | Nov. 14, 1951 |